(12) United States Patent
Chen (10) Patent No.: US 6,400,460 B1
(45) Date of Patent: Jun. 4, 2002

(54) MULTIFUNCTION OPTICAL SENSOR WITH VARIABLE DETECTION THRESHOLD AND NOISE SUPPRESSION

(75) Inventor: Bo Su Chen, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/545,490

(22) Filed: Apr. 10, 2000

(51) Int. Cl.[7] .............................................. G01B 11/14
(52) U.S. Cl. ...................... 356/623; 356/622; 356/614; 356/615
(58) Field of Search ................................ 356/614, 615, 356/621, 622, 624, 625, 623, 602

(56) References Cited

U.S. PATENT DOCUMENTS

| | | | |
|---|---|---|---|
| 4,479,717 A | * 10/1984 | Cornillault | 356/375 |
| 4,575,237 A | 3/1986 | Suzuki | |
| 4,576,481 A | * 3/1986 | Hansen | 356/375 |
| 4,899,041 A | 2/1990 | Fetzer et al. | |
| 5,751,406 A | 5/1998 | Nakazawa et al. | |

FOREIGN PATENT DOCUMENTS

| | | |
|---|---|---|
| DE | 40 32 361 A1 | 4/1992 |
| DE | 197 21 105 A1 | 11/1998 |
| EP | 0 685 748 A1 | 12/1995 |

OTHER PUBLICATIONS

PCT International Search Report.

\* cited by examiner

*Primary Examiner*—Frank G. Font
*Assistant Examiner*—Roy M. Punnoose
(74) *Attorney, Agent, or Firm*—Andrew A. Areyta; Mark Hanley; Trevor Joike (57) ABSTRACT

A sensor for optically detecting a location of an object within a field of the sensor includes first, second and third photodetectors arranged to receive photons from respective first, second and third sensing zones within the field of the sensor. The first, second and third sensing zones are adjacent to one another and the sensor includes a processing circuit that receives first, second and third signals from the respective first, second and third photodetectors. One of the first, second and third signals is indicative of photons reflected by the object within the field of the sensor and the processing circuit compares the one of the first, second and third signals to another one of the first, second and third signals and a predetermined threshold value to determine the location of the object within the field of the sensor.

37 Claims, 5 Drawing Sheets

MULTIFUNCTION OPTICAL SENSOR WITH VARIABLE DETECTION THRESHOLD AND NOISE SUPPRESSION

BACKGROUND OF THE INVENTION

The present invention relates generally to sensors and, more particularly, to a sensor having at least one photodetector that optically detects the location of an object within the field of the sensor.

Conventional optical or photoelectric sensors typically include a source of photons such as a light-emitting diode (LED); a collimating lens that collimates the photons emitted by the LED and that directs the photons toward a sensing field; a photodetector that detects the photons that have been reflected by an object within the field of the sensor; and a converging lens that directs the reflected photons (i.e., forms a convergent beam) toward an aperture of the photodetector. Generally speaking, these conventional convergent-beam-type photoelectric sensors provide a sensing output that is based on the absolute signal levels produced by the photodetector in response to photons which the photodetector receives from the near focal position of the sensor. Additionally, these conventional photoelectric sensors typically compare the absolute signal levels to a predetermined threshold value in order to determine whether an object is located within the field of the sensor. As a result, the sensing capability of these sensors is significantly affected by the surface conditions of the target (e.g., color, roughness, shape, etc.), background radiation or noise, and/or spurious reflections caused by objects not of interest but that are located within regions of the sensing field.

The present invention addresses one or more of these problems.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

In accordance with one aspect of the invention, a sensor that optically detects a location of an object within a field includes first, second and third photodetectors arranged to receive photons from respective first, second and third sensing zones within the field. The sensor includes a processing circuit that receives first, second and third signals from the respective first, second and third photodetectors. One of the first, second and third signals is indicative of photons reflected by the object within the field and the processing circuit compares the one of the first, second and third signals to another one of the first, second and third signals in order to determine the location of the object within the field.

In accordance with another aspect of the invention, a sensor that optically detects the location of an object within a field includes a source of photonic radiation, a first lens, first, second and third photodetectors, a second lens, and a processing circuit. The first lens collimates photons emitted from the source of photonic radiation to form a collimated radiation beam that is directed into the field. The first, second and third photodetectors are arranged to receive photons from respective first, second and third sensing zones within the field; and the first, second and third sensing zones are adjacent to one another. The second lens directs photons reflected by the object within the first, second and third sensing zones to the respective first, second and third photodetectors. The processing circuit receives first, second and third signals from the respective first, second and third photodetectors and one of the first, second and third signals is indicative of photons reflected by the object within the field. The processing circuit compares the one of the first, second and third signals to another one of the first, second and third signals in order to determine the location of the object within the field.

In accordance with yet another aspect of the invention, a method of optically detecting a location of an object includes the steps of: emitting photons into a field; receiving photons reflected by an object within first, second and third sensing zones of the field; converting the photons to first, second and third signals corresponding to the first, second and third zones; and processing the first, second and third signals to determine the location of the object within the field.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, which are incorporated in and form part of the specification, further illustrate the present invention and, together with the detailed description of the invention, serve to explain the principles of the present invention.

DETAILED DESCRIPTION OF THE PREFERRED EMBODIMENTS

The sensor described herein optically detects photons reflected by an object within the field of the sensor and can determine the location of the object with respect to a plurality of predetermined sensing zones that lie within the field of the sensor. More specifically, the sensor described herein has three photo-detectors that are arranged to receive photons from three respective sensing zones. Each of these photodetectors produces a signal that is indicative of the quantity of photons received from its respective sensing zone. Processing circuitry within the sensor processes the photodetector signals to determine if an object lies within a particular one of the sensing zones and the processing circuitry can additionally provide an output signal that indicates the result of this determination.

Generally speaking, the processing circuitry compares the photodetector signals to one another and to a user-adjustable threshold value so that the effects of noise and/or spurious reflections within the sensing zones and varying surface conditions of the target object can be substantially minimized or eliminated altogether to substantially minimize or eliminate false readings at the sensor output. Additionally, the sensor described herein can process the photodetector signals in several different manners to accomplish different user-selectable sensing modes, which significantly increases the application flexibility of the sensor.

Figure 1:
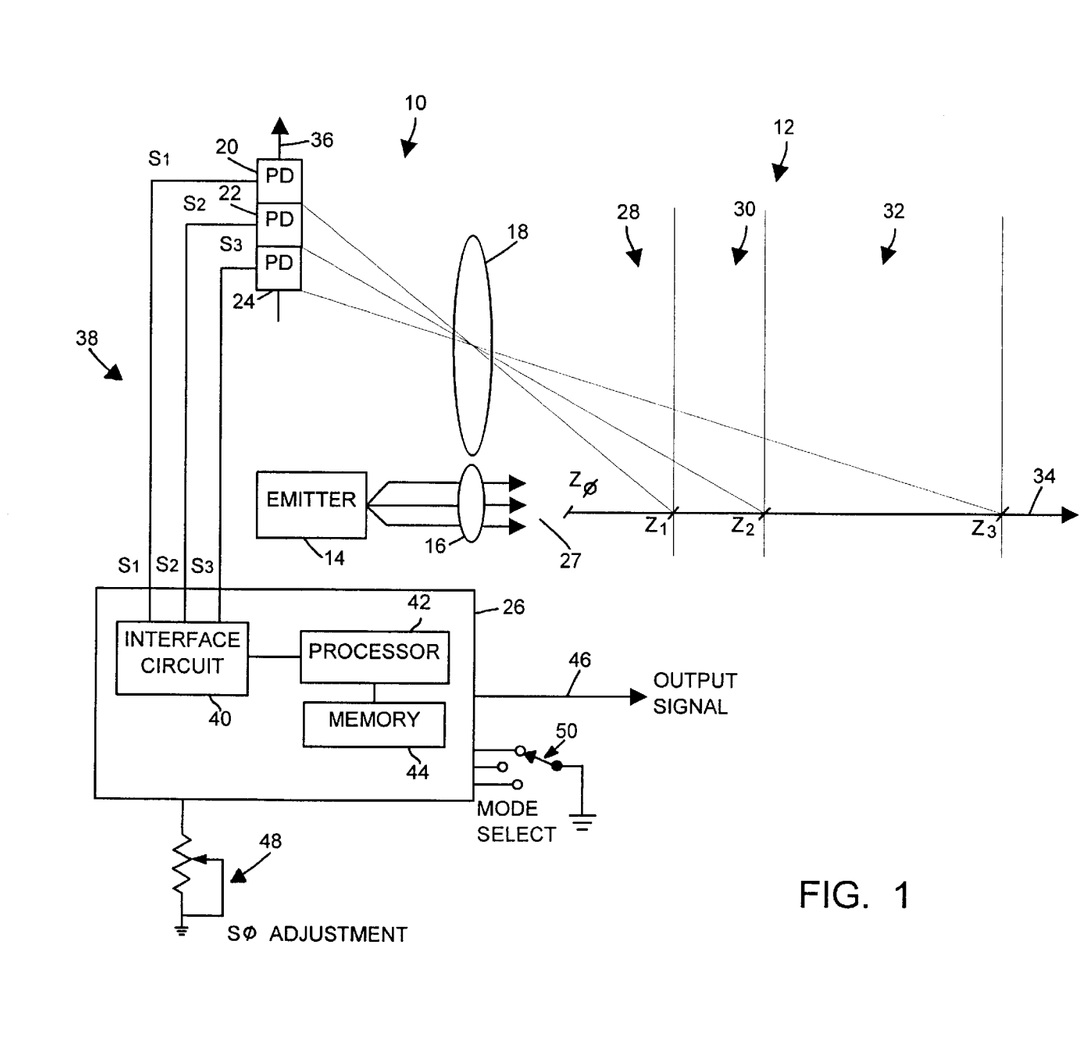
FIG. 1 is a diagrammatic view of a sensor that optically detects the location of an object within a field of the sensor.

FIG. 1 is a diagrammatic view of a sensor 10 that optically detects the location of an object within a field 12 of the sensor 10. The sensor 10 includes an emitter 14 that emits photonic radiation toward the field 12 of the sensor 10, a collimating lens 16, a converging lens 18, first, second, and third photodetectors 20–24, and a processing circuit 26. The emitter 14 is preferably an LED or a laser diode that emits photonic radiation having a wavelength within the visible and/or infrared spectrum. As is commonly known, the emitter 14 can be powered by a constant current or voltage source or can, alternatively, be powered by current or voltage pulses having any desired frequency and duty cycle to suit the particular application for the sensor 10.

The collimating lens 16 is interposed between the emitter 14 and the field 12 so that divergent photons emitted by the emitter 14 are collimated into a collimated photon beam 27, which is directed substantially toward the field 12. As shown in FIG. 1, a portion of the field 12 is sub-divided into a near field sensing zone 28, a middle field sensing zone 30, and a far field sensing zone 32. The three sensing zones 28–32 are adjacent to or contiguous with each other and are arranged along an axis 34 that extends away from the sensor 10.

An object that has a surface capable of reflecting photons and that is located within the near field sensing zone 28, will reflect photons from the collimated photon beam 27 through the converging lens 18 toward the first photodetector 20. Similarly, when the object is located within the middle field sensing zone 30, the photons will be reflected and passed through the converging lens 18 toward the second photodetector 22, and when the object is within the far field sensing zone 32, the photons will be reflected and passed through the converging lens 18 toward the third photodetector 24.

The first, second, and third photodetectors 20–24 can be conventional phototransistors or photodiodes that are arranged along an axis 36. The first, second, and third photodetectors 20–24 can be discrete devices that are arranged as needed on a printed circuit board or, alternatively, can be integrated together on a single substrate such as an integrated circuit chip, a hybrid circuit, etc. In any case, the first, second, and third photodetectors 20–24 are configured so that each of the first, second, and third photodetectors 20–24 receives photons from a corresponding one of the sensing zones 28–32. Further, the first, second, and third photodetectors 20–24 provide respective signals 38 (i.e., $S_1$, $S_2$ and $S_3$) which are indicative of the quantity of reflected photons received by each of the first, second, and third photodetectors 20–24. For example, where the first, second, and third photodetectors 20–24 are photodiodes, the signals 38 can be low-level current signals; and where the first, second, and third photodetectors 20–24 are phototransistors, the signals 38 can be low-level voltage signals produced at the collectors of the first, second, and third photodetectors 20–24.

The processing circuit 26 includes an interface circuit 40, a processor 42 and a memory 44. The interface circuit 40 performs conventional signal conditioning functions so that the signals 38 are compatible with the processor 42. For example, the interface circuit 40 can level shift the photodetector signals 38 and perform an analog-to-digital conversion of the level shifted signals so that the signals 38 can be communicated to the processor 42 as a digital bitstream or digital words. The processor 42 can be any conventional microprocessor or microcontroller that processes the phototransistor signals 38 according to methods (described in greater detail below) which are stored as executable programs within the memory 44.

The processing circuit 26 provides an output signal 46, which can, for example, be a digital signal (i.e., either ON or OFF) based on the location of the object within the field 12 and the processing method used by the processor 42 to to process the signals 38. Additionally, the processing circuit 26 can receive an input from a trimpot 48, which enables a user to vary a predetermined threshold value that is used by the processor 42 to determine the proper state for the output signal 46. Still further, the processing circuit 26 can receive a mode select input from a mode select switch 50, which allows the user to select one from a plurality of stored programs for processing the signals 38.

Figure 2A:
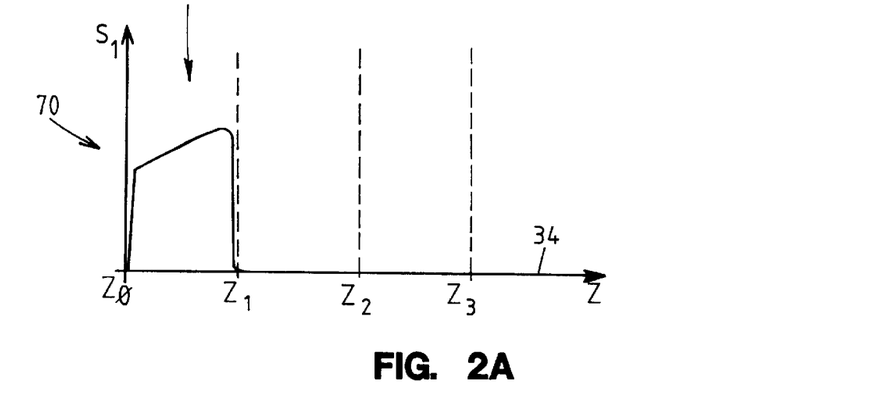
FIGS. 2A–2C graphically depict exemplary response characteristics of the photodetectors shown in FIG. 1.
Figure 2B:
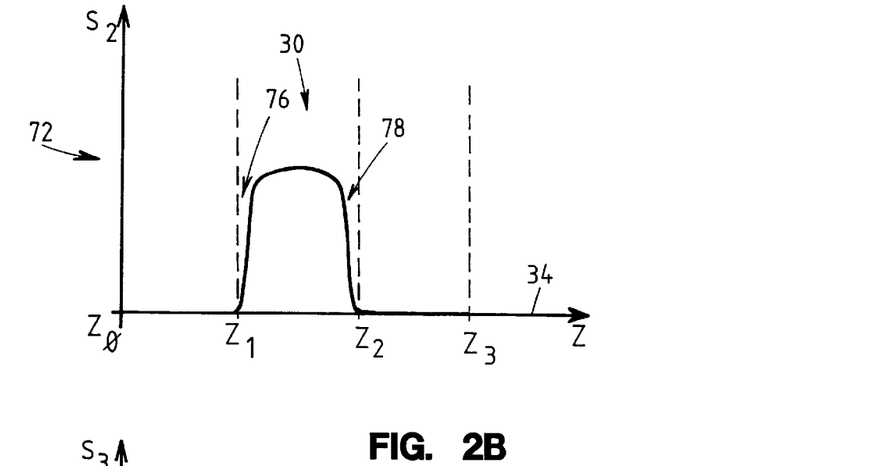
Figure 2C:
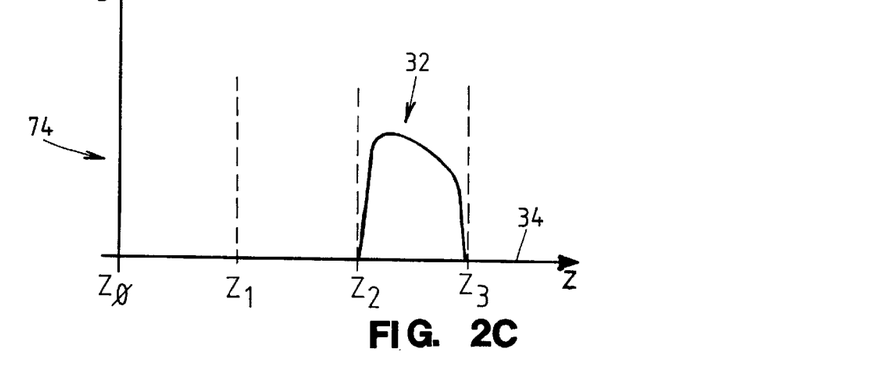

FIGS. 2A–2C graphically depict exemplary response characteristics 70–74 of the respective first, second, and third photodetectors 20–24 dependent upon the location of an object within the sensing zones 28–32. As shown in FIG. 2A, when an object is within the near field sensing zone 28 (i.e., between the points $Z_0$ and $Z_1$ on the axis 34), the signal $S_1$ provided by the first photodetector 20 has a substantial magnitude, while the signals $S_2$ and $S_3$ provided by the second and third photodetectors 22 and 24 have substantially lower or zero magnitudes. Likewise, as shown in FIG. 2B, when the object is within the middle field sensing zone 30 (i.e., between the points $Z_1$ and $Z_2$ on the axis 34), the signal $S_2$ provided by the second photodetector 22 has a substantial magnitude, while the signals $S_1$ and $S_3$ provided by the first and third photodetectors 20 and 24 have substantially lower or zero magnitudes. Finally, as shown in FIG. 2C, when the object is within the far field sensing zone 32 (i.e., between the points $Z_2$ and $Z_3$ on the axis 34), the signal $S_3$ provided by the third photodetector 24 has a substantial magnitude, while the signals $S_1$ and $S_2$ have substantially lower or zero magnitudes.

Thus, as described above and shown in FIGS. 2A–2C, the response characteristics 70–74 of the respective first, second, and third photodetectors 20–24 provide a set of mutually exclusive (i.e., non-overlapping) photodetector signals such that each of the first, second, and third photodetectors 20–24 has a substantial output when an object is located within its associated sensing zone and has a substantially lower or zero output when the object is located within another sensing zone that is not associated with the photodetector. In particular, as shown in FIGS. 2A–2C, the response characteristics 70–74 are such that the signal magnitudes decrease substantially to zero as an object nears the boundaries of the sensing zones 28–32. As a result, separation regions 76 and 78 between the response characteristics of the signals 38 (i.e., $S_1$, $S_2$ and $S_3$) are formed. In these separation regions 76 and 78 the output of each of the first, second, and third photodetectors 20–24 had a substantially low or zero magnitude. As a result, the signals 38 do not overlap, which enables the processing circuit 26 to reliably discriminate between the sensing zones 28–32, particularly when the object lies close to a boundary (e.g., $Z_1$, $Z_2$, etc.) of one of the sensing zones 28–32. However, in many practical applications because the photons received by the first, second and third photodetectors 20–24 are typically reflected by objects having surface characteristics that tend to diffuse the collimated photon beam 27, the response characteristics 70–74 may not exhibit substantially zero magnitude within the separation regions 76 and 78. In fact, in such practical applications, the response characteristics 70–74 can be bell-shaped so that significant overlap of the characteristics 70–74 occurs within the separation regions 76 and 78 and across the sensing zones 28–32.

The above-described mutual exclusivity or separation of the photodetector signals 38 can be accomplished by providing an appropriate aperture on each of the first, second, and third photodetectors 20–24. Such apertures are commonly used to define physical regions from which photodetectors can receive and detect photons. Essentially, these apertures function as a screen or mask that blocks detection of photons that have trajectories consistent with regions outside the desired sensing zones. Alternatively or additionally, a separation region between the signals 38 can be achieved electronically by, for example, using a comparator circuit to further signal condition the signals 38 so that, when a photodetector signal falls below some predetermined magnitude (which may be substantially greater than zero), the comparator output changes state to become, for example, substantially zero volts.

On the other hand, in some applications, it may be desirable to provide a certain amount of response overlap between the signals 38. For instance, in applications where a target object is relatively small and/or where the object is likely to fall near a boundary of a sensing zone, it can be beneficial to provide such a response overlap. In any event, those skilled in the art will recognize that the amount of overlap or separation between the response characteristics can be varied to suit the particular application.

The processing circuit 26 can be programmed to process the signals 38 in one of several manners that are selectable by a user via the mode select switch 50. The processor 42 can determine to which position the mode select switch 50 has been set and can retrieve and execute one or more software routines stored on the memory 44 as needed.

Figure 3:
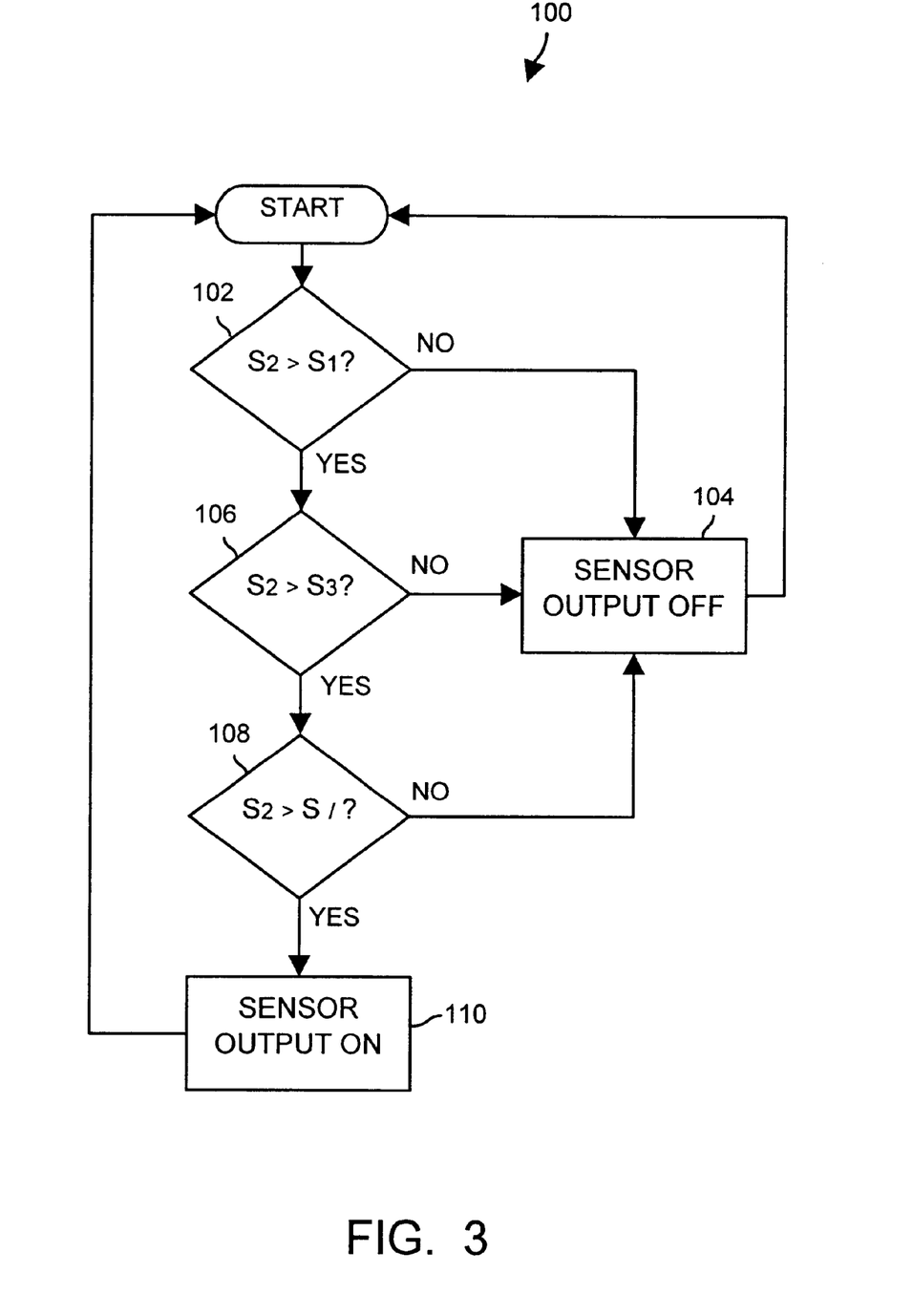
FIG. 3 is an exemplary flow diagram depicting one method of accomplishing a convergent scan operational mode using the sensor of FIG. 1.

By way of example only, FIG. 3 is a flow diagram that depicts one method 100 by which the signals 38 can be processed to accomplish a convergent scan operational mode. In general, the method 100 shown in FIG. 3 indicates the presence of an object located within the middle field sensing zone 30 by changing the output signal 46 from an OFF condition (e.g., a logical low condition) to an ON condition (e.g., a logical high condition). Also, generally, the method 100 compares the signal $S_2$, which is provided by the second photodetector 22 and which is indicative of the quantity of photons emanating from the middle sensing zone 30, to the signals $S_1$ and $S_3$, which are provided by the respective first and third photodetectors 20 and 24 and which are representative of the quantity of photons emanating from the respective near field and far field sensing zones 28 and 32. The method 100 also compares the signal $S_2$ to a predetermined threshold value $S_0$ (which is user adjustable via the trimpot 48). Because the method 100 detects the presence or absence of an object based on the relative magnitudes, as opposed to the absolute magnitudes, of the signals 38, the method 100 more reliably discriminates between background noise (i.e., electrical circuit noise, background radiation, etc.), spurious reflected photons (e.g., photons that are reflected by an object which is moving through a portion of the sensing field 12 but which is not of interest), and photons which are reflected by an object within the sensing zone of interest (e.g., the middle field sensing zone 30).

More specifically, in a block 102, the signal $S_2$ of the second photodetector 22 is compared to the signal $S_1$ of the first photodetector 20 and, if the magnitude of $S_2$ is less than the magnitude of $S_1$, the method 100 enters a block 104 and turns the sensor output 46 OFF. If the magnitude of the signal $S_2$ is greater than that of the signal $S_1$, then the method 100 enters a block 106 and compares the signal $S_2$ to the signal $S_3$. If the magnitude of the signal $S_2$ is less than the magnitude of the signal $S_3$, the method 100 enters the block 104 and turns the sensor output 46 OFF. If the magnitude of the signal $S_2$ is greater than the magnitude of the signal $S_3$, the method enters a block 108. In the block 108, the method 100 compares the signal $S_2$ to the predetermined threshold value $S_0$ and, if the magnitude of the signal $S_2$ is less than the predetermined threshold value $S_0$, the method 100 enters the block 104 and turns the sensor output 46 OFF. If the magnitude of the signal $S_2$ is greater than the predetermined threshold value $S_0$, then the method 100 enters a block 110 and turns the sensor output 46 ON.

Figure 4:
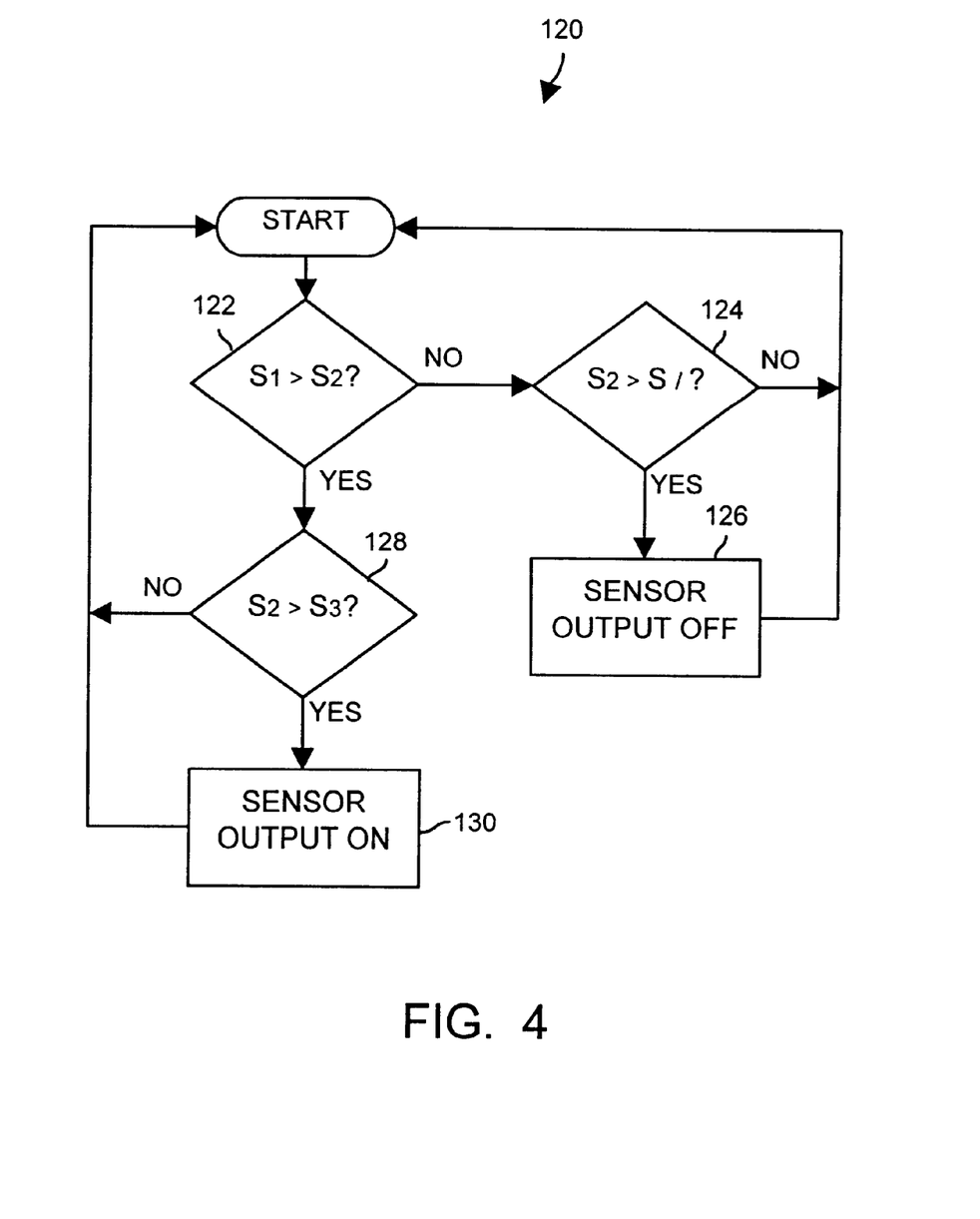
FIG. 4 is another exemplary flow diagram depicting a method of accomplishing a near field background suppression operational mode using the sensor of FIG. 1.

FIG. 4 is a flow diagram illustrating another method 120 of processing the signals 38 to accomplish a near-field background suppression operational mode. In general, the method 120 shown in FIG. 4 indicates the presence of an object located within the near-field sensing zone 28 by changing the output signal 46 from an OFF condition to an ON condition. More specifically, in a block 122, the method 120 compares the signal $S_1$ to the signal $S_2$ and, if the magnitude of the signal $S_1$ is less than the magnitude of the signal $S_2$, the method 120 enters a block 124. In the block 124, the method 120 compares the magnitude of the signal $S_2$ to the predetermined threshold value $S_0$ and, if the magnitude of the signal $S_2$ is greater than the predetermined threshold value $S_0$, the method 120 enters a block 126 and turns the sensor output 46 OFF. If, in the block 122, the magnitude of the signal $S_1$ is greater than the magnitude of the signal $S_2$, then the method 120 enters a block 128. In the block 128, the method 120 compares the signal $S_1$ to the predetermined threshold value $S_0$ and, if the magnitude of the signal $S_1$ is greater than the predetermined threshold value $S_0$, then the method 120 enters a block 130 and turns the sensor output 46 ON.

On the other hand, (i) if the magnitude of the signal $S_1$ is not greater than the signal $S_2$ and the magnitude of the signal $S_2$ is not greater than the predetermined threshold value $S_0$, or (ii) if the magnitude of the signal $S_1$ is greater than the signal $S_2$ but the magnitude of the signal $S_1$ is not greater than the predetermined threshold value $S_0$, then no action is taken with respect to the sensor output 46.

Figure 5:
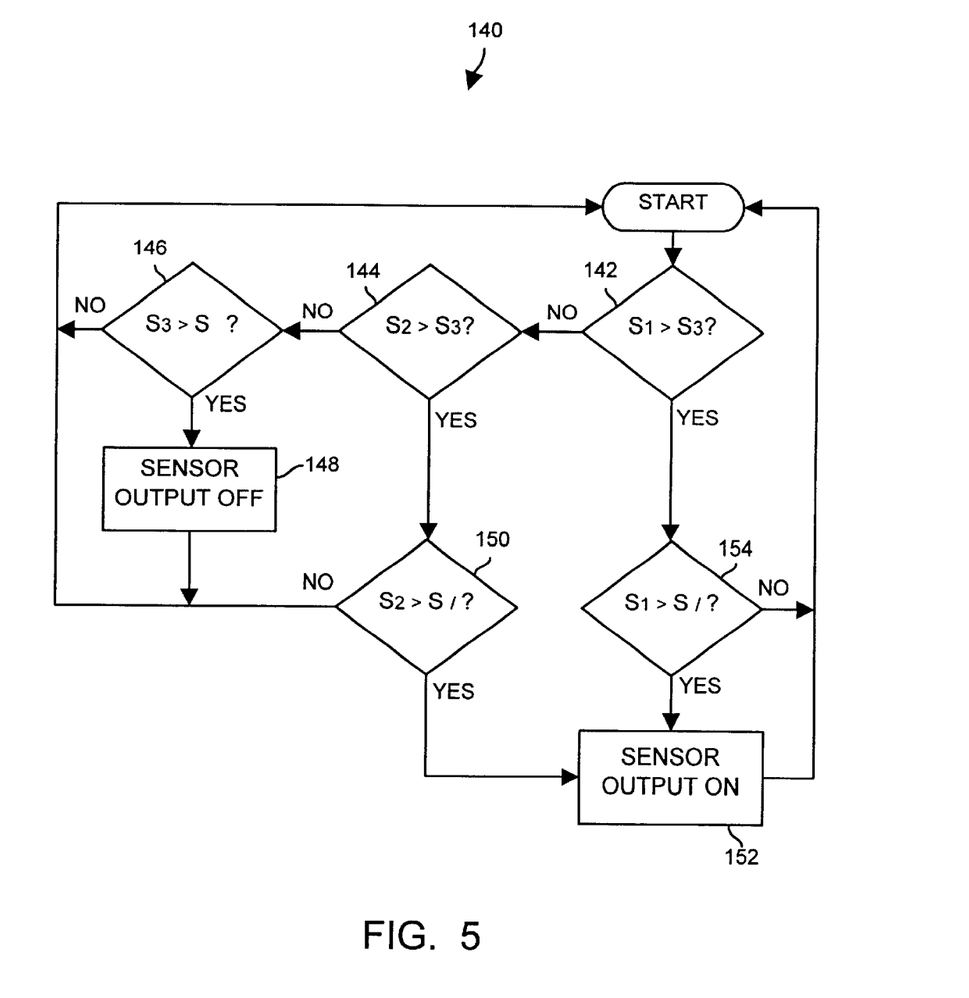
FIG. 5 is yet another exemplary flow diagram depicting a method of accomplishing a far field background suppression operational mode using the sensor of FIG. 1.

FIG. 5 is a flow diagram depicting another method 140 of processing the signals 38 that accomplishes a far-field background suppression operational mode. Generally speaking, the method 140 shown in FIG. 5 indicates the presence of an object located within either of the near-field and middle-field sensing zones 28 and 30 by changing the output signal 46 from an OFF condition to an ON condition. More specifically, in a block 142, the method 140 compares the signal $S_1$ to the signal $S_3$ and, if the magnitude of the signal $S_1$ is less than the magnitude of the signal $S_3$, the method 140 enters a block 144. In the block 144, the method 140 compares the signal $S_2$ to the signal $S_3$ and, if the magnitude of the signal $S_2$ is less than the magnitude of the signal $S_3$, then the method 140 enters a block 146. In the block 146, the method 140 compares the signal $S_3$ to the predetermined threshold value $S_0$ and, if the magnitude of the signal $S_3$ is greater than the magnitude of the signal $S_0$, then the method 140 enters a block 148 and turns the sensor output 46 OFF. In the block 144, if the magnitude of the signal $S_2$ is greater than the magnitude of the signal $S_3$, then the method 140 enters a block 150. In the block 150, the method 140 compares the signal $S_2$ to the predetermined threshold value $S_0$ and, if the magnitude of the signal $S_2$ is greater than the predetermined threshold value $S_0$, then the method 140 enters a block 152 and turns the sensor output 46 ON. In the block 142, if the magnitude of the signal $S_1$ is greater than the magnitude of the signal $S_3$, then the method 140 enters a block 154. In the block 154, the method 140 compares the signal $S_1$ to the predetermined threshold value $S_0$ and, if the magnitude of the signal $S_1$ is greater than the predetermined threshold value $S_0$, the method 140 enters the block 152 and turns the sensor output 46 ON.

On the other hand, (i) if the magnitude of the signal $S_1$ is not greater than the signal $S_3$ and the magnitude of the signal $S_2$ is not greater than the signal $S_3$ and the signal $S_3$ is not greater than the predetermined threshold value $S_0$, or (ii) if the magnitude of the signal $S_1$ is not greater than the signal $S_3$ and the magnitude of the signal $S_2$ is greater than the signal $S_3$ but the signal $S_2$ is not greater than the predetermined threshold value $S_0$, or (iii) if the magnitude of the signal $S_1$ is greater than the signal $S_3$ but the magnitude of the signal $S_1$ is not greater than the predetermined threshold value $S_0$, then no action is taken with respect to the sensor output 46.

As can be seen from the above description, the sensor described herein advantageously uses at least one, but preferably three, photodetectors to receive photons from at least one, but preferably three, respective sensing zone within the field of the sensor. In particular, the sensor described herein enables a user to select one from a plurality of available methods for processing the photodetector signals, thereby providing a high degree of application flexibility. Generally speaking, these processing methods make relative comparisons using the photodetector signals and a user-adjustable threshold value to discriminate between noise, other spurious signals, and signals associated with an object within the sensing zone of interest, thereby more reliably determining the location of the object within the sensing zone or zones of interest. Additionally, because the processing methods are based on relative comparisons between signals, the sensor described herein is relatively insensitive to variations in the surface conditions of objects to be detected within the sensing zone or zones of interest.

Generally, the above-described processing circuit 26 is efficiently implemented using a general purpose processor as the processor 46 to execute a number of software code segments or modules that are retrieved from a computer readable memory, such as the memory 44. However, other combinations of hardware and software using, for example, application-specific integrated circuits (i.e., ASICS) or other types of hardware or firmware or software alone can be used to accomplish the same functions without departing from the scope of the invention.

The embodiments and examples set forth herein are presented to best explain the present invention and its practical application and to thereby enable those skilled in the art to make and utilize the invention. For example, three modes of using the sensor have been described above. However, other modes of using the sensor should be apparent to one of ordinary skill in the art. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A sensor that optically detects a location of an object within a field comprising:
   first, second and third detectors arranged to receive photons from respective first, second and third sensing zones within the field; and
   a processing circuit that receives first, second and third signals from the respective first, second and third detectors, wherein one of the first, second and third signals is indicative of photons reflected by the object within the field and wherein the processing circuit compares the one of the first, second and third signals to another one of the first, second and third signals in order to determine the location of the object within the field.

2. The sensor of claim 1, further including a source of photonic radiation that emits photons into the field.

3. The sensor of claim 2, further including a lens for directing the emitted photons into the field.

4. The sensor of claim 2, wherein the source of photonic radiation is a light-emitting diode.

5. The sensor of claim 2, wherein the source of photonic radiation is a laser diode.

6. The sensor of claim 1, wherein the first, second and third detectors are photodiodes.

7. The sensor of claim 1. wherein the first, second and third detectors are phototransistors.

8. The sensor of claim 1, wherein the first, second and third detectors are arranged along a first axis and wherein the first, second and third sensing zones are located along a second axis.

9. The sensor of claim 8, wherein the first and second axes are substantially perpendicular to each other.

10. The sensor of claim 8, wherein the first, second and third sensing zones are adjacent to one another.

11. The sensor of claim 8, wherein the first, second and third detectors are adjacent to one another.

12. The sensor of claim 9, wherein the first, second and third sensing zones are adjacent to one another.

13. The sensor of claim 1, wherein the first, second and third sensing zones are adjacent to one another.

14. The sensor of claim 1, further including a lens for directing the reflected photons to one of the first, second and third detectors.

15. A sensor that optically detects the location of an object within a field comprising:
   a source of photonic radiation;
   a first lens that collimates photons emitted from the source of photonic radiation to form a collimated radiation beam that is directed into the field;
   first, second and third detectors arranged to receive photons from respective first, second and third sensing zones within the field, wherein the first, second and third sensing zones are adjacent to one another;

a second lens that directs photons reflected by the object within the first, second and third sensing zones to the respective first, second and third detectors; and a processing circuit that receives first, second and third signals from the respective first, second and third detectors, wherein one of the first, second and third signals is indicative of photons reflected by the object within the field and wherein the processing circuit compares the one of the first, second and third signals to another one of the first, second and third signals to determine the location of the object within the field.

16. The sensor of claim 15, wherein the source of photonic radiation is a light-emitting diode.

17. The sensor of claim 15, wherein the source of photonic radiation is a laser diode.

18. The sensor of claim 15, wherein the first, second and third photodetectors are photodiodes.

19. The sensor of claim 15, wherein the first, second and third detectors are phototransistors.

20. The sensor of claim 15, wherein the first, second and third detectors are arranged along a first axis and wherein the first, second and third sensing zones are arranged along a second axis.

21. The sensor of claim 20, wherein the first and second axes are substantially perpendicular to one another.

22. A method of optically detecting a location of an object, comprising the steps of:

emitting photons into a field;

receiving photons reflected by an object within one of first, second and third sensing zones of the field;

converting the photons to first, second and third signals corresponding to the first, second and third sensing zones; and processing the first, second and third signals to determine the location of the object within the field.

23. The method of claim 22, wherein the processing step includes the step of comparing one of the first, second and third signals to another one of the first, second and third signals.

24. The method of claim 23, wherein the comparing step includes the steps of comparing the second signal to the first signal and the third signal and determining based on the comparisons whether the object is located within the second sensing zone.

25. The method of claim 24, wherein the determining step includes the steps of determining whether the second signal is greater than the first signal and determining whether the second signal is greater than the third signal.

26. The method of claim 25, wherein the step of determining whether the object is located within the second sensing zone includes the step of determining whether the second signal is greater than a predetermined threshold value.

27. The method of claim 23, wherein the comparing step includes the steps of comparing the first signal to the second signal and determining based on the comparison whether the object is located within the first sensing zone.

28. The method of claim 27, wherein the step of determining whether the object is located within the first sensing zone includes the step of determining whether the first signal is greater than the second signal.

29. The method of claim 28, wherein the step of determining whether the object is located within the first sensing zone includes the step of determining whether the first signal is greater than a predetermined threshold value.

30. The method of claim 28, wherein the step of determining whether the object is located within the first sensing zone includes the step of determining whether the second signal is greater than a predetermined threshold value.

31. The method of claim 30, wherein the step of determining whether the object is located within the first sensing zone includes the step of determining whether the first signal is greater than the predetermined threshold value.

32. The method of claim 23, wherein the comparing step includes the steps of comparing the first signal to the third signal and comparing the second signal to the third signal and determining based on the comparisons whether the object is located in one of the first and second sensing zones.

33. The method of claim 32, wherein the step of determining whether the object is located in one of the first and second sensing zones includes the steps of determining whether the first signal is greater than third signal and determining whether the second signal is greater than the third signal.

34. The method of claim 33, wherein the step of determining whether the object is located within one of the first and second sensing zones includes the step of determining whether one of the first and second signals is greater than a predetermined threshold value.

35. The method of claim 34, wherein the step of determining whether the object is located within one of the first and second sensing zones includes the step of determining whether third signal is greater than the predetermined threshold value.

36. The method of claim 22, wherein the step of processing the first, second and third signals includes the step of comparing one of the first, second and third signals to a predetermined threshold value.

37. The method of claim 22, further including the step of generating an output signal indicative of the location of the object within the field.

* * * * *